United States Patent Office.

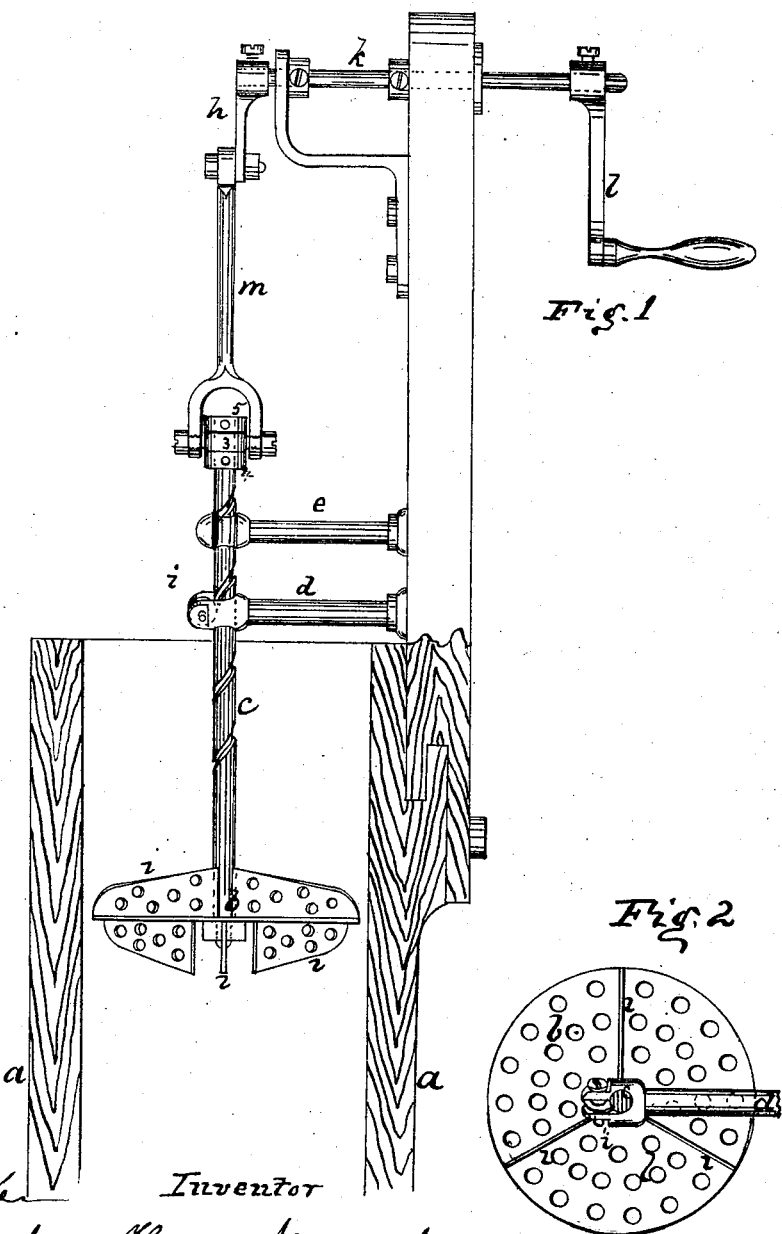

HENRY McDONOUGH, OF NEW YORK, N. Y.

Letters Patent No. 75,286, dated March 10, 1868.

---

IMPROVEMENT IN CHURN-DASHERS

---

*The Schedule referred to in these Letters Patent and making part of the same.*

---

TO ALL WHOM IT MAY CONCERN:

Be it known that I, HENRY McDONOUGH, of the city and State of New York, have invented and made a certain new and useful Improvement in Dashers for Churns and Ice-Cream Freezers; and I do hereby declare the following to be a full, clear, and exact description of the said invention, reference being had to the annexed drawing, making part of this specification, wherein—

Figure 1 is a vertical section of the upper part of a churn with my improved dasher applied thereto; and Figure 2 is a plan of the dasher, and the roller that causes the revolution of the dasher and rod as they are reciprocated.

Similar marks of reference denote the same parts.

The object of my said invention is to impart a rotary movement to the dasher as it is reciprocated, in order that the cream may be subjected to a centrifugal action, as well as a concussion, to more thoroughly mix, lighten up, and comminute the cream, either in the process of forming butter, or in the freezing for ice-cream, in the latter case preventing the formation of hard lumps, and rendering the top of the cream as cold and thoroughly frozen as the bottom portion.

My invention consists in a dasher, formed with perforations in the horizontal disk, and with vertical perforated wings, set upon a shaft that has a spiral rib or groove, and to which a reciprocation is given, the groove or rib at the same time producing a rotation for the purposes aforesaid.

In the drawing, $a$ represents a portion of the churn-barrel; it may, however, represent the position of the ice-cream freezer, in which case it should be formed of sheet metal. $b$ is the dasher, formed as a horizontal perforated disk, with wings 2 2 standing vertically above and below the dasher, and also perforated. $c$ is the rod of the dasher, running through supports $d$ and $e$, in which it is free to be reciprocated by power applied in any convenient manner. $i$ is a roller, the edge of which enters a spiral groove in the rod $c$ to cause the rotation as said rod reciprocates, as aforesaid. I have represented a crank, $h$, on a shaft, $k$, rotated by a handle, $l$, to give motion to the connecting-rod $m$, that is fitted with a universal joint-collar, 3; and 4 and 5 are nuts in the sides of the collar 3 that allow the rod $c$ and said nuts 4 and 5 to revolve as the parts are reciprocated by the said crank-motion.

What I claim, and desire to secure by Letters Patent, is—

The dasher $b$, constructed as specified, and mounted on the rod $c$, to which a revolving movement is communicated by the spiral rib or groove as the parts are reciprocated, as and for the purposes set forth.

In witness whereof, I have hereunto set my signature, this twenty-fourth day of August, 1867.

HENRY McDONOUGH.

Witnesses:
GEO. D. WALKER,
GEO. T. PINCKNEY.